(12) United States Patent
Yang

(10) Patent No.: US 6,729,745 B2
(45) Date of Patent: May 4, 2004

(54) WARNING LIGHT GENERATING DEVICE FOR VEHICLE

(76) Inventor: A-Sheng Yang, P.O. Box 10-69, Chong Ho, Taipei (TW), 235

(*) Notice: Subject to any disclaimer, the term of this patent is extended or adjusted under 35 U.S.C. 154(b) by 0 days.

(21) Appl. No.: 10/191,242

(22) Filed: Jul. 3, 2002

(65) Prior Publication Data

US 2004/0004833 A1 Jan. 8, 2004

(51) Int. Cl.[7] .................................................. F21L 4/00
(52) U.S. Cl. ........................ 362/203; 501/800; 501/191; 501/540
(58) Field of Search ................................ 362/202, 203, 362/204, 540, 501, 800, 191, 186

(56) References Cited

U.S. PATENT DOCUMENTS 3,943,352 A * 3/1976 Pena May .................. 362/501
5,117,341 A * 5/1992 Huang ........................ 362/184
6,511,203 B1 * 1/2003 Winther ...................... 362/202

* cited by examiner

Primary Examiner—Sandra O'Shea
Assistant Examiner—Ali Alavi

(57) ABSTRACT

A light device a base received in a housing and having a conductor disposed on the upper portion and having a seat supported above the base with one or more spring blades and movable downwardly beyond the conductor. A casing includes a circuit board, a light member attached to the circuit board, a panel, and one or more batteries coupled to the circuit board for energizing the light member. The panel includes two conductors coupled to the circuit board and forceable to engage with the conductor of the base when the casing is forced or depressed toward the base.

7 Claims, 5 Drawing Sheets

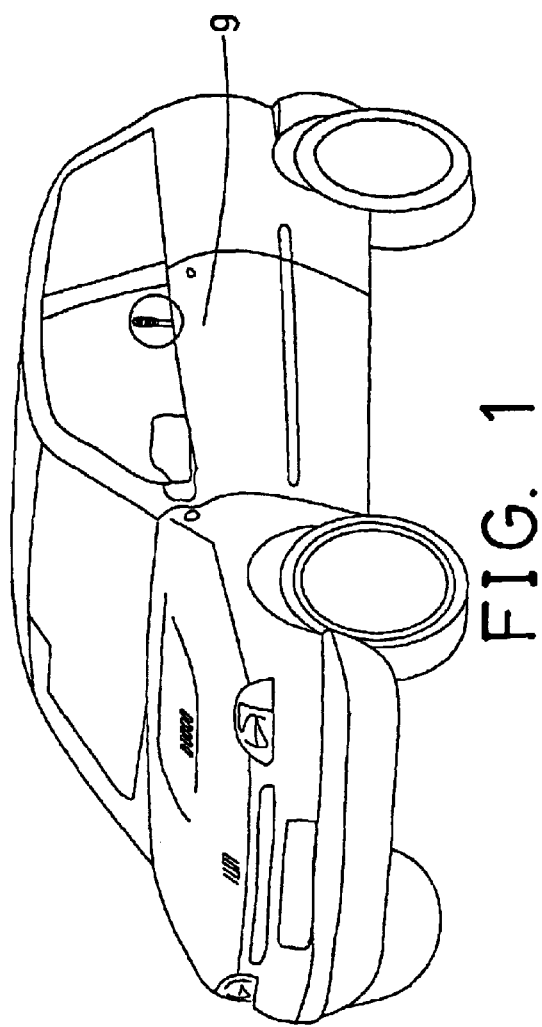
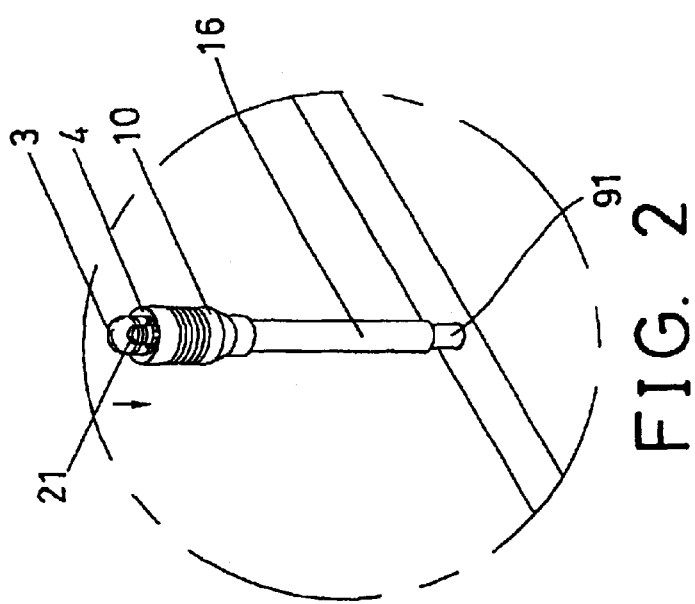

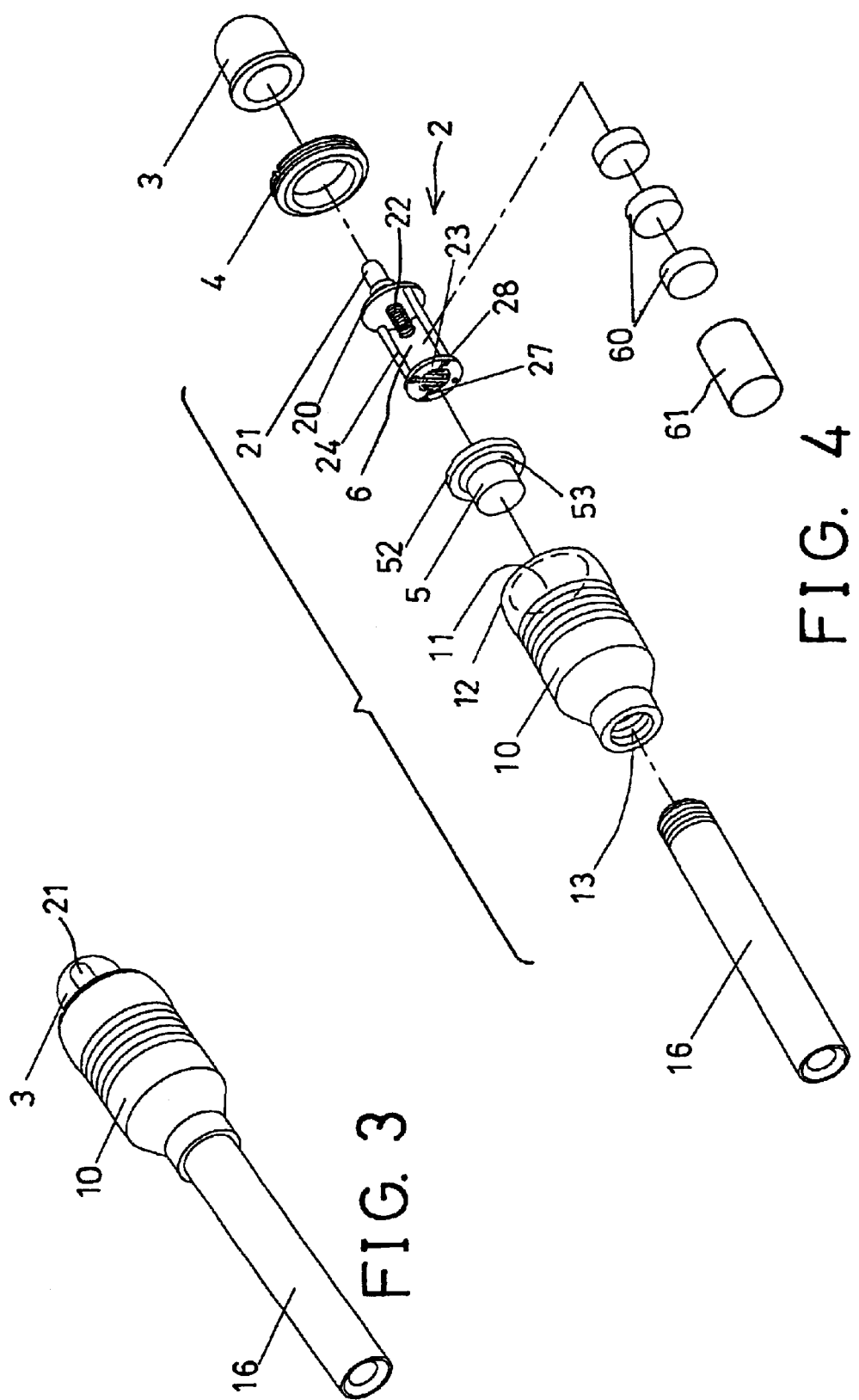

WARNING LIGHT GENERATING DEVICE FOR VEHICLE

BACKGROUND OF THE INVENTION

1. Field of the Invention

The present invention relates to a light device, and more particularly to a warning light generating device for vehicles.

2. Description of the Prior Art

Typically, the vehicles have no warning lights or the other light devices provided on the side portions thereof, such that the other people, particularly the drivers of the other vehicles may not clearly see the side portions of the vehicles, and thus may easily hit onto the side portions of the vehicles inadvertently.

The present invention has arisen to mitigate and/or obviate the afore-described disadvantages of the conventional warning light generating devices.

SUMMARY OF THE INVENTION

The primary objective of the present invention is to provide a warning light generating device for generating the warning lights to signal the side portions of the vehicles, and for preventing the vehicles from being hit by the other vehicles from the side portions thereof.

The other objective of the present invention is to provide a warning light generating device for generating the warning lights when the doors of the vehicles are opened by either the users or the other peoples.

In accordance with one aspect of the invention, there is provided a light device comprising a housing including a chamber formed therein, a base received in the chamber of the housing, and including an upper portion having a first conductor disposed thereon, and including a seat supported above the base with at least one spring blade and movable downwardly beyond the first conductor, a casing including a circuit board, and a panel, a light member attached to the circuit board, at least one battery engaged between the circuit board and the panel and coupled to the circuit board for energizing the light member. The panel includes a second and a third conductors attached thereto and coupled to the circuit board and facing toward the first conductor. The seat of the base is engaged with the panel for separating the second and the third conductors from the first conductor. The second and the third conductors are forceable to engage with the first conductor when the casing and the light member are depressed toward the base.

The second and the third conductors each includes at least one extension extended therefrom and disposed close to each other.

The casing includes a pair of conductor rods secured between the circuit board and the panel and electrically coupled to the second and the third conductors, for electrically coupling the second and the third conductors to the circuit board.

The battery is disposed between the conductor rods, the casing includes a sleeve engaged between the battery and the conductor rods for preventing the battery from being contacted with the conductor rods.

The panel includes a fourth conductor attached thereto and opposite to the second and the third conductors and engaged with the battery, and includes a pin electrically coupling the fourth conductor to either the second or the third conductors.

A cover may further be provided and engaged onto the light member, and a lock ring may be threaded to the housing for retaining the cover and the casing in the housing. The housing includes a tube attached thereto for engaging onto the other objects, such as the cover switch of the vehicle.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a vehicle having a warning light generating device in accordance with the present invention;

FIG. 2 is an enlarged partial perspective view illustrating the attachment of the warning light generating device onto the door switch of the vehicle;

FIG. 3 is a perspective view of the warning light generating device;

FIG. 4 is an exploded view of the light device;

DETAILED DESCRIPTION OF THE PREFERRED EMBODIMENT

Figure 6:
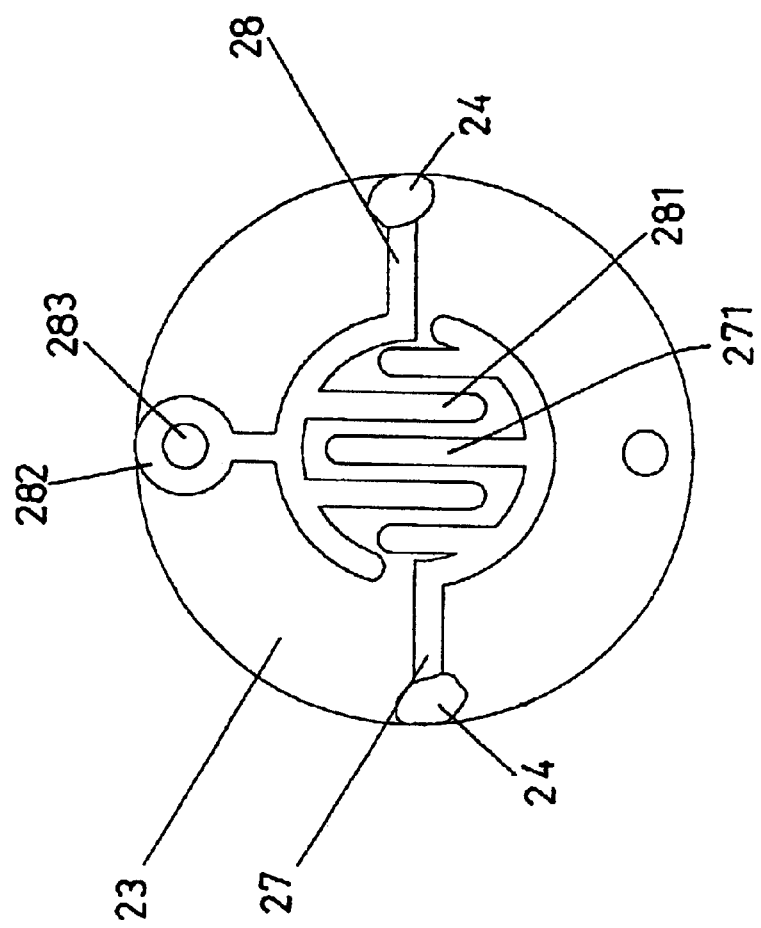
FIG. 6 is a bottom view of a casing of the light device.

Referring to the drawings, and initially to FIGS. 1 and 2, a warning light generating device in accordance with the present invention is provided for attaching onto the vehicle 9, such as attaching onto the door switch 91 of the vehicle 9, for generating the warning lights to signal the side portions of the vehicles, and to prevent the vehicles from being hit by the other vehicles from the side portions thereof.

Referring next to FIGS. 3–6, the light device comprises a housing 10 including a hollow chamber 11 formed therein and having an opening 12 formed in one end, such as formed in the upper portion thereof, and including a screw hole or an inner thread 13 formed in the lower portion thereof for threading with a tube 16 which may be engaged or attached onto the door switch 91 of the vehicle 9, for example.

A base 5 is received in the chamber 11 of the housing 10, such as received in the bottom of the chamber 11 of the housing 10, and includes a conductor 51 disposed or provided on top thereof, and includes a seat 52, such as a ring-shaped seat 52 provided on the peripheral portion thereof and resiliently coupled to the base 5 with one or more resilient or spring blades 53 or the like.

Figure 8:
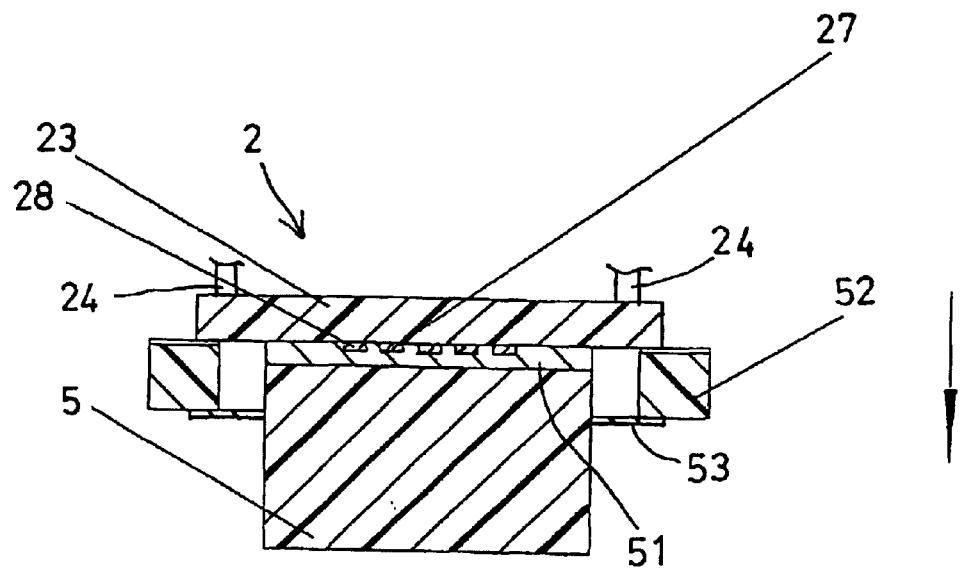
FIGS. 7, 8 are partial cross sectional views illustrating the operation of the light device.
Figure 7:
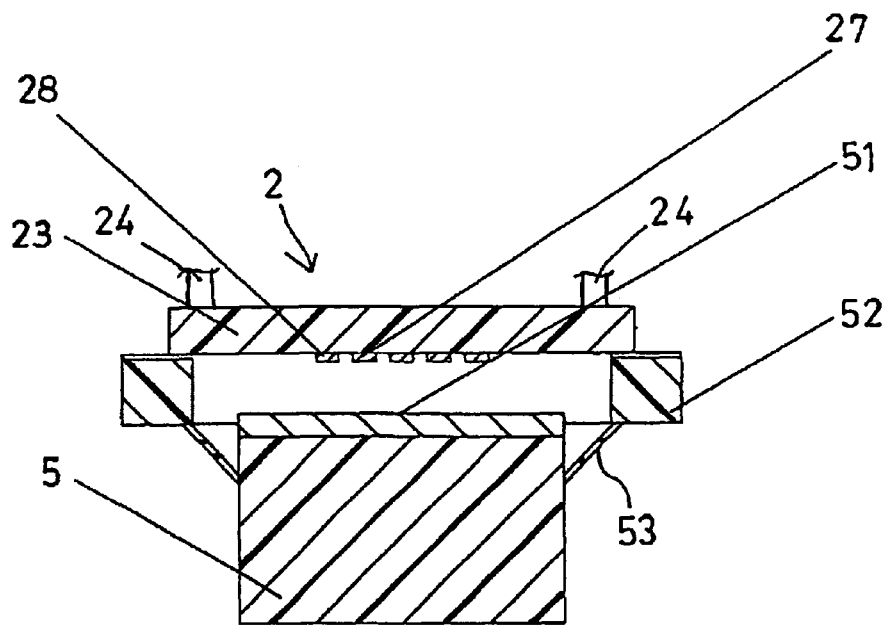

For example, as shown in FIG. 7, the spring blades 53 may resiliently support the seat 52 above the conductor 51, and may be forced and bent downwardly for allowing the seat 52 to be moved downwardly beyond the conductor 51, or for allowing the conductor 51 to be exposed, as shown in FIG. 8, when the seat 52 is forced downwardly relative to the base 5.

A casing 2 is also received in the chamber 11 of the housing 10, such as received in the upper portion of the chamber 11 of the housing 10, and includes a circuit board 20 and a panel 23, and one or more, such as two conductor rods 24 secured between the circuit board 20 and the panel 23, for forming a space 6 in the casing 2 and for receiving one or more batteries 60 therein. A protective sleeve 61 may further be provided and engaged between the batteries 60 and the conductor rods 24, for safety purposes, or for preventing the batteries 60 from being contacted with the conductor rods 24.

The circuit board 20 includes a spring 22 coupled thereto and disposed in the space 6 of the casing 2, for engaging with the batteries 60, such as the case electrode of the batteries 60, and includes two terminals 26 electrically coupled to the conductor rods 24 respectively, and includes a socket 201 provided thereon for receiving or coupling a light member 21.

The panel 23 includes an upper portion having a conductor 25 disposed or attached thereon for engaging with the batteries 60, such as the central electrode of the batteries 60, and includes two further conductors 27, 28 disposed or attached to the bottom thereof and opposite to the conductor 25 and electrically coupled to the conductor rods 24 respectively, best shown in FIG. 6 and having one or more extensions 271, 281 disposed close to each other or disposed side by side.

One of the conductors 28 includes a terminal 282 electrically coupled to the conductor 25 with a pin 283 which extends through the panel 23, such that the batteries 60, such as the central electrode of the batteries 60 may be coupled to one of the conductor rods 24 with the conductors 25, 28 and the pin 283. The other conductor 27 may be coupled to such as the case electrode of the batteries 60 with the other conductor rod 24 and the circuit board 20 and the spring 22.

A transparent or semi-transparent hood or canopy or cover 3 may further be provided and engaged onto the light member 21, and preferably partially engaged into the opening 12 of the housing 10. A lock ring or a lock nut 4 may be engaged onto the peripheral portion of the cover 3 and threaded to the housing 10, for retaining the cover 3 and thus the casing 2 and the base 5 in the chamber 11 of the housing 10.

In operation, as shown in FIG. 7, the spring blades 53 of the base 5 has a resilience good enough for supporting the casing 2 and the batteries 60, and for spacing the conductors 27, 28 from the conductor 51 of the base 5, such that the conductors 27, 28 and the conductor 51 may not be electrically coupled together, and such that the light member 21 may not be energized.

When the casing 2, or the light member 21, or the cover 3 is depressed or forced inwardly or into the housing 10, against the spring force of the spring blades 53 of the base 5 by such as the users, as shown in FIG. 8, the seat 52 may be forced downwardly relative to the base 5 against the spring blades 53, for allowing the conductors 27, 28 and the conductor 51 to be electrically coupled together, and for allowing the light member 21 to be energized by the batteries 60.

Figure 5:
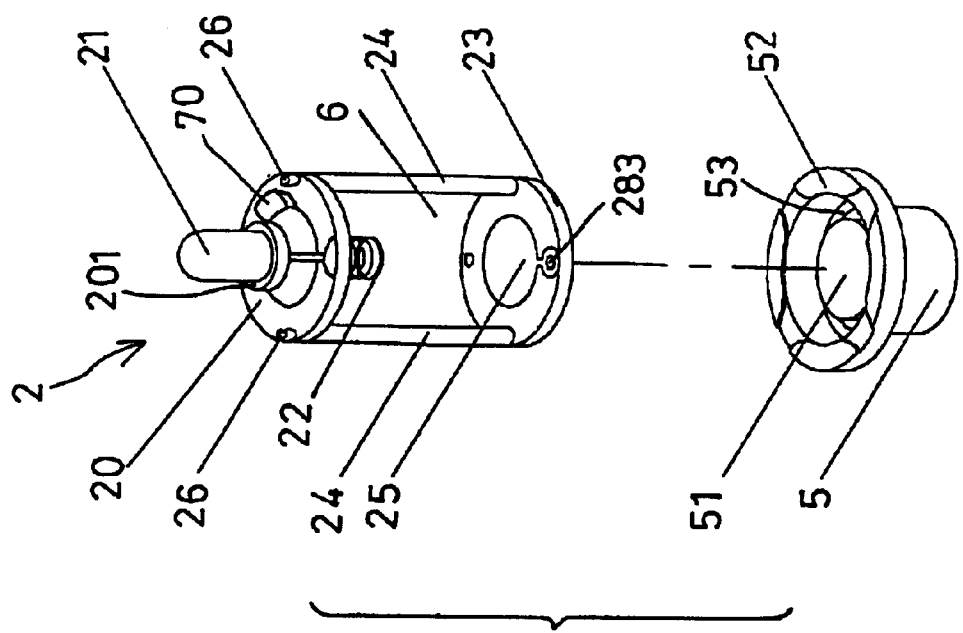
FIG. 5 is a partial exploded view of the light device.
Figure 9:
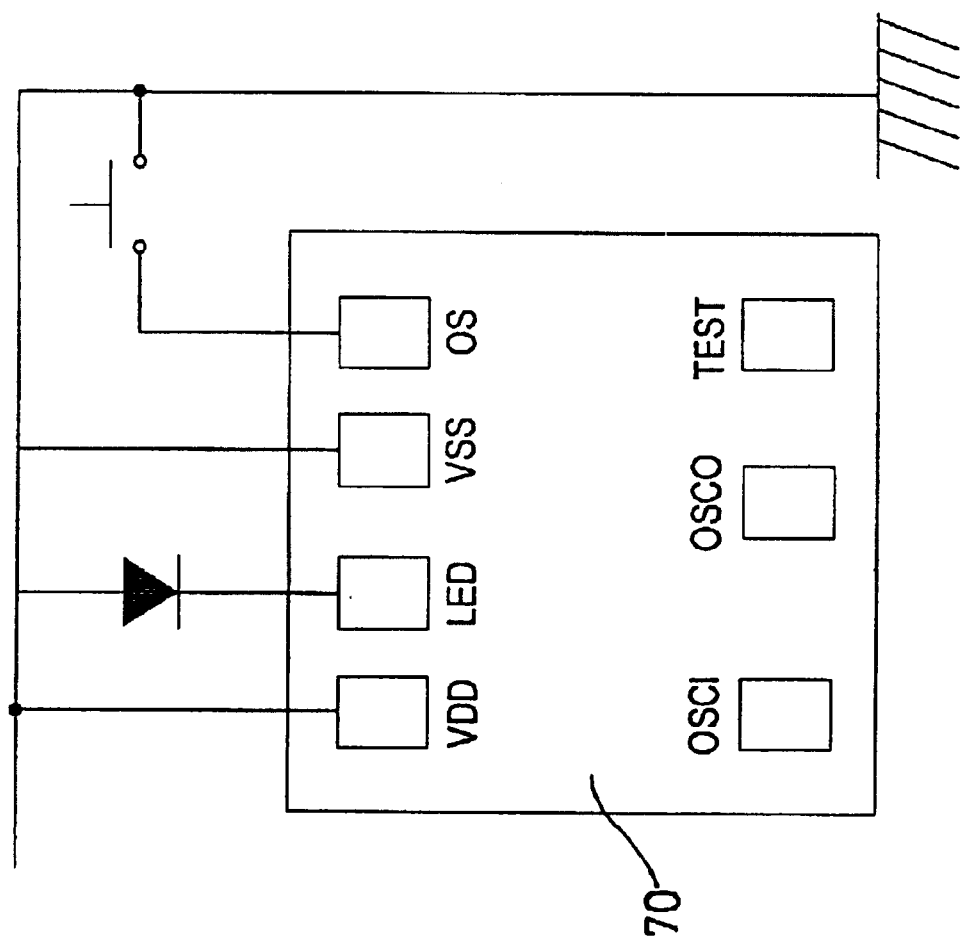
FIG. 9 is a schematic view illustrating the processor device of the light device.

Referring next to FIG. 9 and again to FIG. 5, the circuit board 20 may further include a processor unit or an integrated circuit 70, for controlling the operation of the light member 21. For example, when the conductor 51 is forced to electrically contact with the conductors 27, 28 once, in order to electrically couple the conductors 27, 28 with each other, the light member 21 may be energized to generate warning light.

When the conductor 51 is forced to electrically contact with the conductors 27, 28 again, in order to electrically couple the conductors 27, 28 with each other again, the light member 21 may be shut off, for example. Similarly, the light member 21 may then be energized again when the conductor 51 is forced to electrically contact with the conductors 27, 28 again.

When the light device is depressed inadvertently by the other unauthorized persons who may try to steal the vehicle, the light member 21 may be energized when the conductor 51 is forced to electrically contact with the conductors 27, 28, in order to generate the warning lights to prevent the vehicles from being stolen by the unauthorized persons.

The light device may be attached to the windows of the vehicles with sucker members or the like (not shown), for generating the warning lights to signal the side portions of the vehicles, and to prevent the vehicles from being hit by the other vehicles from the side portions thereof.

Accordingly, the warning light generating device in accordance with the present invention may be used for generating the warning lights to signal the side portions of the vehicles, and for preventing the vehicles from being hit by the other vehicles from the side portions thereof, or for generating the warning lights when the doors of the vehicles are opened by either the users or the other peoples.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light device comprising:
   a housing including a chamber formed therein,
   a base received in said chamber of said housing, and said base including an upper portion having a first conductor disposed thereon, and said base including a seat supported above said base with at least one spring blade and movable downwardly beyond said first conductor,
   a casing including a circuit board, and a panel,
   a light member attached to said circuit board,
   at least one battery engaged between said circuit board and said panel and coupled to said circuit board for energizing said light member, and
   said panel including a second and a third conductors attached thereto and coupled to said circuit board and facing toward said first conductor,
   said seat of said base being engaged with said panel for separating said second and said third conductors from said first conductor, and said second and said third conductors being forceable to engage with said first conductor when said casing and said light member are depressed toward said base.

2. The light device according to claim 1, wherein said second and said third conductors each includes at least one extension extended therefrom and disposed close to each other.

3. The light device according to claim 1, wherein said casing includes a pair of conductor rods secured between said circuit board and said panel and electrically coupled to said second and said third conductors, for electrically coupling said second and said third conductors to said circuit board.

4. The light device according to claim 3, wherein said at least one battery is disposed between said conductor rods, said casing includes a sleeve engaged between said at least one battery and said conductor rods for preventing said at least one battery from being contacted with said conductor rods.

5. The light device according to claim 1, wherein said panel includes a fourth conductor attached thereto and opposite to said second and said third conductors and engaged with said at least one battery, and includes a pin electrically coupling said fourth conductor to either said second or said third conductors.

6. The light device according to claim 1 further comprising a cover engaged onto said light member, and a lock ring threaded to said housing for retaining said cover and said casing in said housing.

7. The light device according to claim 1, wherein said housing includes a tube attached thereto for engaging onto objects.

\* \* \* \* \*